Aug. 6, 1929.  P. WEST  1,723,105

DEACTIVATOR

Filed Feb. 21, 1923   2 Sheets-Sheet 1

INVENTOR
Perry West:
BY Lewis J. Doolittle,
ATTORNEY

Aug. 6, 1929.   P. WEST   1,723,105
DEACTIVATOR
Filed Feb. 21, 1923   2 Sheets-Sheet 2
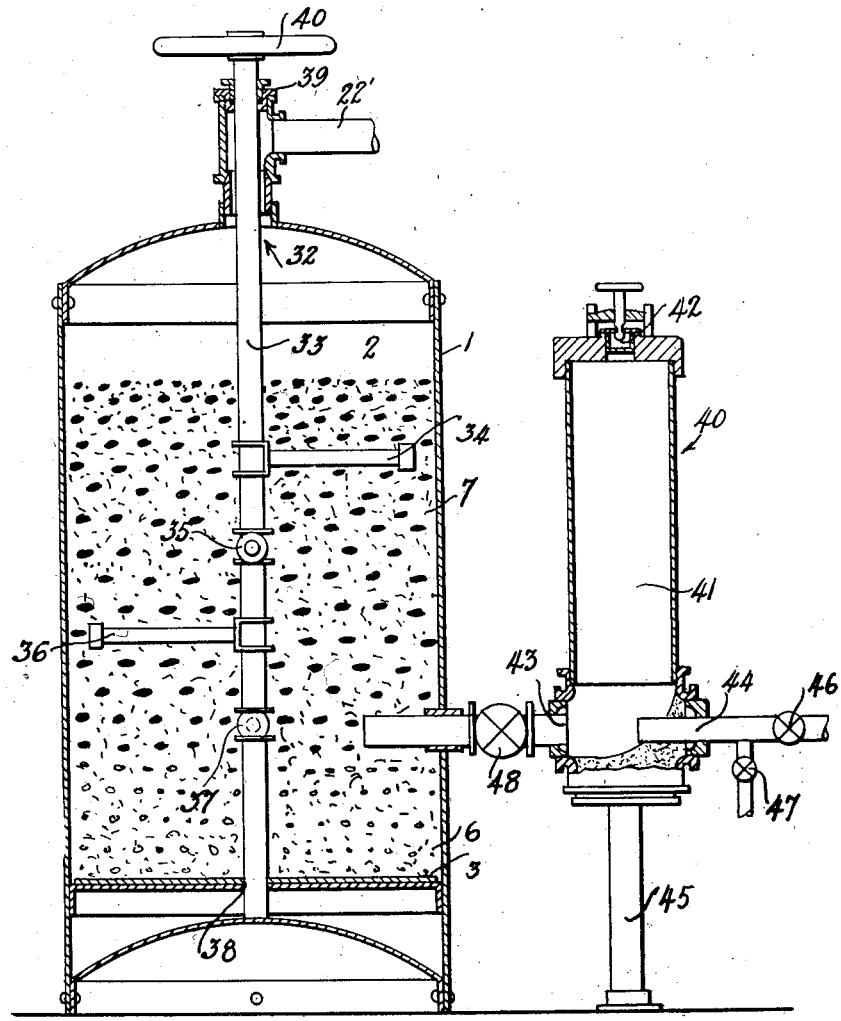
INVENTOR
Perry West
BY
Lewis J. Doolittle
ATTORNEY Patented Aug. 6, 1929.

1,723,105

UNITED STATES PATENT OFFICE.

PERRY WEST, OF NEWARK, NEW JERSEY, ASSIGNOR, BY MESNE ASSIGNMENTS, TO ELLIOTT COMPANY, OF PITTSBURGH, PENNSYLVANIA, A CORPORATION OF PENNSYLVANIA.

DEACTIVATOR.

Application filed February 21, 1923. Serial No. 620,377.

This invention relates to an apparatus or means for treatment of water or other fluids to render the same substantially non-corrosive.

It is known that the corrosion from water is due to the presence of free dissolved oxygen and other free corrosive elements contained therein, which, when the water is brought into contact with the metal walls of pipes or boilers, etc., forms an oxide, or other compound, commonly known as "rust," or other products of corrosion, which corrosive action destroys the piping etc., or causes deterioration of the same, and also causes a discoloration of the water flowing in the system.

The object of this invention is to render the water or other fluid treated non-corrosive by the provision of apparatus and means whereby the free corrosive agents in the fluid are removed. A further and more particular object of the invention is to provide an arrangement of the apparatus and device whereby the active elements of the same may be easily regenerated and kept in an active and effective operating condition.

In the drawings, in which I have illustrated one of the preferred embodiments of my invention, like parts in the several views have been given the same reference numeral.

Fig. 3 is a similar view showing additional features.

Figure 1:
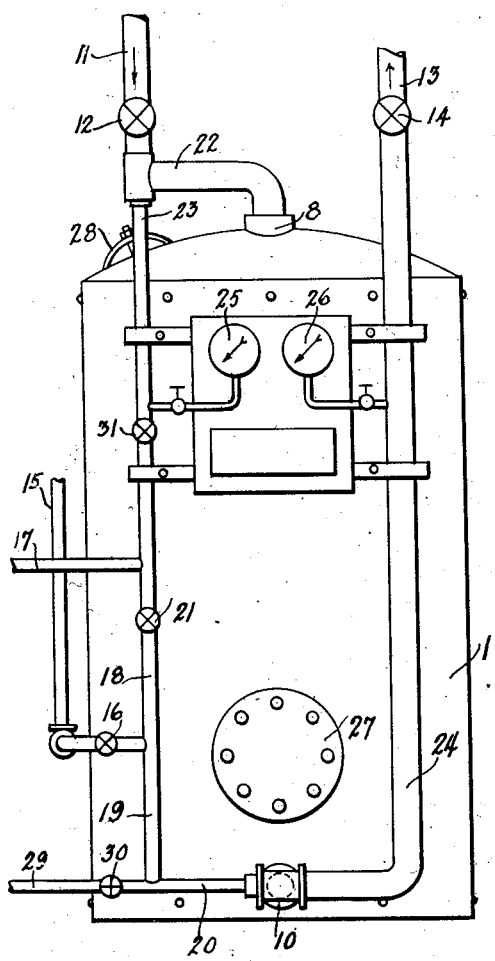
Fig. 1 is a front elevation of a device for carrying out the objects of my invention as herein set forth.

A tank, constructed of steel or other suitable material, is shown generally at 1. This tank is divided into two chambers, the upper chamber 2 being the chamber where the treatment of the fluid is effected to remove the corrosive elements therefrom.

The upper chamber 2 is separated from the lower chamber by a plate 3, which is provided with a number of strainer heads 4, which are adapted to prevent the material in the upper chamber from passing out with the fluid into the lower or collecting chamber 5.

The upper chamber 2 is partially filled with one or more strainer beds. In the arrangement as shown two of these beds are provided, the lower bed, indicated at 6, rests upon the plate 3 and is composed of an inert or inactive material, such as gravel, while the upper bed, indicated at 7, resting upon the lower bed 6, is composed of a suitable oxidizable material in small pieces, such as granular zinc, mixed with an inactive, insoluble and abrasive material, such as sand.

At the upper end of the tank 1, an inlet pipe or opening 8 is provided and a baffle plate 9 is positioned just below this inlet to cause the incoming fluid to be distributed over the top surface of the strainer beds.

An outlet 10 leads from the lower collecting chamber 5, from which the fluid flows through the pipes 24 and 13 to the system to be supplied with the water or other fluid. A valve 14 is provided in this last mentioned pipe line to control the flow therefrom.

The water or fluid supply or source is connected to the apparatus by the pipe 11 and pipe 22 leading to the inlet opening 8 and is provided with a valve 12 controlling the inlet flow.

It is important to clean or wash the apparatus after the same has been in operation, in order to keep the same in its most efficient and effective operative condition. This feature of operation will be explained more fully hereinafter. The piping for this consists of a pipe 15 which is connected to a suitable source of supply of a suitable washing fluid. A valve 16 controls the supply through the pipe 15. 17 is a waste pipe or outlet, connected by the pipes 18, 19 and 20 with the outlet 10 from the chamber 5 and 21 is a valve for controlling the flow in this last mentioned pipe line.

A pipe connection 23, provided with a valve 31, provides a connection between the supply pipe line 11—22 and the waste pipe 17, while the pipe 29 and its valve 30, which valve is closed except when it is desired to drain the tank, provides a convenient means for this purpose.

Pressure gauges, of the usual type, are shown at 25 and 26, connected respectively to the pipes 23 and 24, that is, to the inlet and outlet pipe lines, and indicate the pressure of the fluid entering and leaving the apparatus.

Openings, provided with the usual covers, for cleaning out and filling or charging the apparatus, are indicated at 27 and 28.

The valves 16, 21, 30 and 31 are normally closed while the device is in use and are only opened for the purpose of cleaning the apparatus, as will be explained hereinafter.

The pipe 11 being connected to the source of fluid supply and the pipe 13 connected to the system to which the fluid is to be distributed or used and the valves 12 and 14 opened, the fluid will flow from the pipe 11 through pipe 22 and inlet 8 over the baffle 9 to the top surface of the filter bed 7 and, while passing through this bed, is brought into contact with the oxidizable and deactivating material, with the result that the free dissolved oxygen and other corrosive elements contained in the fluid are separated out of the fluid and combined with the deactivating material. The fluid then passes through the second section of the filter bed 6 and through the strainer heads 4 into the chamber 5, from which it passes through the outlet 10, pipe 24 and pipe 13 to the system being supplied with the deactivated fluid.

The process of separating out the corrosive gases from the fluid passing through the filter beds usually results in an oxide and other compounds being formed which coat over and collect on the particles of the deactivating material and also on the inert material mixed therewith. This coating as it accumulates will retard the action of the deactivating material, as well as reduce the efficiency of the filter bed, and in order to keep the apparatus in an active and efficient operating condition it is necessary to remove this coating from time to time. The provision of a simple and effective means for removing this coating, together with the general cleaning of the filter beds by the removal of all accumulated material, forms an important feature of this invention.

This washing or cleaning is accomplished as follows:

The main inlet and outlet valves 12 and 14 are closed and the valves 16 and 31 opened. The pipe 15, being connected to a suitable source, such as an elevated tank or tank and pump of the usual construction, supplies a washing fluid, water or other suitable fluid, which is caused to flow through the apparatus in a reverse direction, passing into the same through the pipes 19 and 20, through opening 10 to the chamber 5, and is then forced upwardly through the strainers 4 and filter beds 6 and 7, through the inlet 8 at the top of the chamber 1 and pipes 22 and 23 to the waste pipe 17. By this means the abrasive inert material and the deactivating material in the filter beds 6 and 7 are agitated and the accumulated coatings of oxides, etc., is efficiently removed and carried out of the apparatus by the washing fluid.

This washing or cleaning is continued until the apparatus and filter beds are thoroughly cleaned, after which the valves 16 and 31 are closed (the main outlet valve 14 also remaining closed) and the main inlet valve 12 and the valve 21 are opened. The water then flows into the apparatus in the normal direction from the supply pipe 11, through pipe 22 and inlet 8, passing through the filter beds 7 and 6, strainers 4, chamber 5, outlet 10, pipes 20, 19 and 18, and out of the waste pipe 17. This flow of water through the apparatus is continued until it shows (by test of a sample) that it is of proper quality to be delivered to the water system, which is accomplished by opening the main outlet valve 14 and closing valve 21, causing the water to flow normally through the apparatus to the system to which the pipe 13 is connected.

It will also be noted that the fluid in passing through the filter beds is not only treated to remove the corrosive elements, as described, but that these beds also operate to filter out and remove any suspended matter that may be contained in the fluid and that this matter so removed and collected in the beds is removed or washed out through the waste pipe by the washing process just described.

As the coating of the particles of the filter beds increases and as the film of suspended matter from the fluid collects, on the top surface largely, of the upper bed 7, the resistance to the flow of the fluid through the apparatus increases. This results in an increase in the difference in pressure between the inlet and outlet, which is indicated by the pressure gauges 25 and 26. These gauges thus become indicators of the condition of the apparatus and inform the operator when the washing process is necessary.

Figure 2:
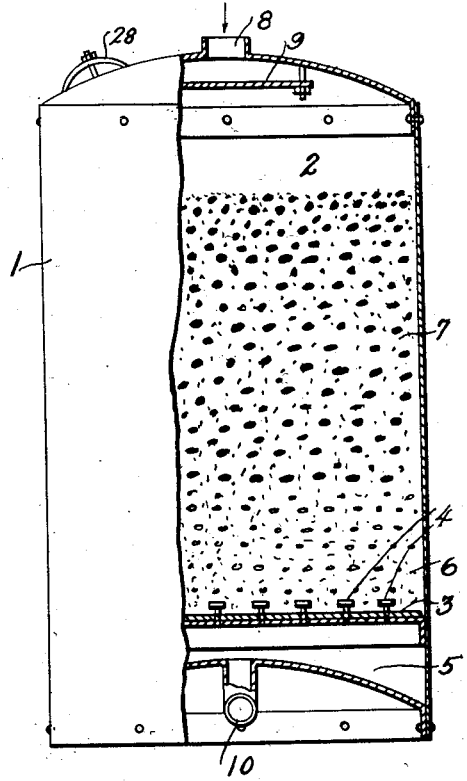
Fig. 2 is a view similar to Fig. 1, with some of the parts removed and also partly broken away, to more clearly show the arrangement.

The coating of the particles in the beds 6 and 7 sometimes cements these particles together, and in such cases an arrangement such as shown in Fig. 3 may be provided to mechanically break up the mass and facilitate the cleaning operation thereof, hereinbefore described. In this arrangement, the inlet 32 is made large enough to accommodate a shaft 33 and, at the same time to allow the incoming fluid from the pipe 22' (corresponding to the pipe 22 of Fig. 1) to pass into the upper compartment of the tank 1, where it is acted upon as it passes through the beds 7 and 6, as described in connection with Figs. 1 and 2.

A shaft 33 extends through the beds 6 and 7 and is provided with radially extending arms, such as shown at 34, 35, 36 and 37, rigidly attached thereto. A suitable bearing 38 is provided at the lower end of this shaft 33 and a suitable bearing and stuffing box 39 at the upper portion thereof. A hand wheel 40 is attached at the upper end of the shaft 33 for rotating the same with the arms 34—37, which effects a breaking up of the particles or mass of material in the beds 6 and 7, thus facilitating the cleaning thereof by passing the cleaning fluid therethrough, or while passing the same therethrough, as hereinbefore described.

When the deactivating material has been exhausted, the beds are removed from the tank and new beds placed therein. This operation of "charging" the apparatus is effected by placing the beds of inactive material in the tank. The deactivating material is then placed in the charging pot 40, Fig. 3, which is provided with a chamber 41 and a removable cover 42. An outlet pipe 43 connects the lower end of this chamber 41 with the interior of the tank 1, extending through the wall of the tank 1 into the lower portion of the upper bed 7, and an inlet pipe 44 enters the lower end of the chamber 41 opposite the outlet pipe 43. This inlet pipe 44 is connected with a suitable source of fluid supply under pressure, by providing a supply tank at a suitable height above the tank to give the necessary pressure by gravity or a pressure pump, etc., may be provided. A valve 46 controls the inlet pipe flow and a valve 48 the outlet through the outlet pipe 43. Valve 47 is provided in connection with the drain pipe for draining the chamber 41, and the device may be mounted on a suitable support or base 45 in the proper relative position to the tank 1.

The charging of the tank is effected by opening the valves 46 and 48, which creates a rapid current of the fluid from the inlet pipe 44 into and out of the outlet pipe 43 and into the tank 1, carrying along with the fluid the deactivating material from the chamber 41 into the tank 1 and mixing it with the upper bed 7.

After all of the material has been carried out from the chamber 41, valves 46 and 48 are closed, the cover 42 opened and the drain valve 47 opened, thus draining the fluid out of the chamber 41.

The deactivating tank 1 is now re-charged and ready for operation, in the manner described.

What I claim is:—

1. A device of the class described, comprising a tank, a strainer bed composed of fine particles of an inert abrasive material, a chamber adapted to contain a deactivating material and provided with an outlet connected to said tank and extending into said abrasive material, and means for causing a fluid under pressure to flow through said chamber and outlet and for discharging said deactivating material directly into said strainer bed to be intimately mixed therewith.

2. A device of the class described, comprising a tank, a strainer bed composed of fine particles of an inert abrasive material, a chamber adapted to contain a deactivating material and provided with an outlet at the lower end thereof connected to said tank and extending into said abrasive material, and an inlet pipe entering said chamber opposite said outlet and adapted to admit a fluid under pressure into the lower portion of said chamber and to flow out of the same through said outlet carrying the deactivating material into said tank and mixing it in the upper portion of said bed and superimposing on the lower portion of the bed an upper bed of deactivating material mixed with inert material.

Signed at New York, in the county of New York and State of New York, this 23d day of January, A. D. 1923.

PERRY WEST.